(12) United States Patent
Zielinski et al.

(10) Patent No.: US 7,925,479 B2
(45) Date of Patent: Apr. 12, 2011

(54) EFFICIENT PROCESS FOR EVALUATING ENGINE COOLING AIRFLOW PERFORMANCE

(75) Inventors: Kurt Zielinski, Columbus, OH (US); Mike Unger, North Lewisburg, OH (US); James McKillen, Maryville, OH (US); Karl Forster, Powell, OH (US); Bob Larson, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 858 days.

(21) Appl. No.: 11/781,101

(22) Filed: Jul. 20, 2007

(65) Prior Publication Data
US 2009/0024374 A1   Jan. 22, 2009

(51) Int. Cl.
*G06G 7/48* (2006.01)
(52) U.S. Cl. .............................. 703/8; 703/1
(58) Field of Classification Search .................. 703/8
See application file for complete search history.

(56) References Cited

U.S. PATENT DOCUMENTS

| | | | |
|---|---|---|---|
| 4,186,872 A * | 2/1980 | Bland et al. .............. | 236/34.5 |
| 6,081,654 A * | 6/2000 | Morman et al. ........... | 703/1 |
| 6,088,521 A | 7/2000 | Strumolo et al. | |
| 6,178,928 B1 * | 1/2001 | Corriveau ................. | 123/41.12 |
| 6,760,693 B1 | 7/2004 | Singh et al. | |
| 6,941,249 B1 * | 9/2005 | Miller et al. ............. | 703/1 |
| 7,079,996 B2 | 7/2006 | Stweart et al. | |
| 7,103,519 B2 | 9/2006 | Singarajan et al. | |
| 7,136,779 B2 | 11/2006 | Nitsche et al. | |
| 7,275,023 B2 * | 9/2007 | Chen et al. ............. | 703/2 |
| 7,558,649 B1 * | 7/2009 | Sharma et al. .......... | 700/282 |
| 2006/0277010 A1 | 12/2006 | Schutte et al. | |
| 2008/0167787 A1 * | 7/2008 | Kang et al. ............ | 701/103 |

OTHER PUBLICATIONS

Johannessen et al, "Comparison Between Experimental and Numerical Methods for Evaluating Car Cooling System Design", Melbourne Graduate Fluids Conference, Monash University, 2001.*
Schulz et al, "Interactive Visualization of Fluid Dynamics Simulations in Locally Refined Cartesian Grids", Proceedings of the Conference on Visualization '99, pp. 413-416, 1999.*
Strumolo, Gary, "VAWT: The Virtual Aerodynamic/Acoustic Wind Tunnel", Journal of Engineering Mathematics, 43, pp. 173-187, 2002) teaches a method of evaluating vehicle designs both aerodynamically and aeroacoustically in a virtual environment.*
Ng et al, "An Analytical Study on Heat Transfer Performance of Radiators with Non-Uniform Airflow Distribution", Proceedings Institute of Mechanical Engineers, vol. 219, Part d: J. Automobile Engineering, 2005.*
Chacko et al, "Numerical Simulation for Improving Radiator Efficiency by Air Flow Optimization", ANSA&μETA International Congress 2005.*

(Continued)

*Primary Examiner* — Mary C Jacob
(74) *Attorney, Agent, or Firm* — Mark E. Duell, Esq.; Emerson Thomson Bennett

(57) ABSTRACT

The present invention generally relates to processes for predicting airflow rates. According to some embodiments, some process steps can include developing a three-dimensional computer-aided design model of a test body topology; discretizing the test body topology; discretizing a volume surrounding the test body topology, the volume being bounded by a test chamber; identifying test body components upon which to collect empirical data; obtaining empirical data for identified components; establishing an airflow model; validating the airflow model in comparison to experimental data; obtaining a flow rate from the validated airflow model; and determining whether the mass flow rate is acceptable.

18 Claims, 2 Drawing Sheets

OTHER PUBLICATIONS

Park et al, "Thermal Flow Analysis of Vehicle Engine Cooling System", KSME International Journal, vol. 16, No. 7, pp. 975-985, 2002.*

Sofu et al, "Measurement and Analysis of Underhood Ventilation Airflow and Temperatures for an Off-Road Machine", The Aerodynamics of Heavy Vehicles: Trucks, Busses and Trains, Lecture Notes in Applied Computational Mechanics, vol. 19, 2004.*

Fellague et al, "Determination of the Effects of Inlet Air Velocity and Temperature Distributions on the Performance of an Automotive Radiator", SAE International Congress and Exposition, Feb. 28-Mar. 3, 1994.*

Srun, Ngy, "A Simple Engine Cooling System Simulation Model", SAE International Congress and Exposition, Mar. 1-4, 1999.*

Wang et al, "CFD Predictions of Minivan's Front-End Flow Performance", IEEE International Conference on Vehicular Electronics and Safety, Dec. 13-15, 2006.*

Eton, Y. Ng, Use of a Pressure Based Technique for Evaluating The Aerodynamics of Vehicle Cooling Systems, SAE Paper; 2002-01-0712.

* cited by examiner

EFFICIENT PROCESS FOR EVALUATING ENGINE COOLING AIRFLOW PERFORMANCE

I. BACKGROUND OF THE INVENTION

A. Field of Invention

This invention relates to processes for evaluating engine-cooling airflow in relation to vehicle topology. More particularly, the present invention relates to processes for quickly and efficiently evaluating airflow performance of various designs by developing a base model, and making and evaluating small changes thereto.

B. Description of the Related Art

Modeling engine cooling airflow is known in the art of automobile design. The prior art modeled the effect of each body design on cooling airflow. Accordingly, each time a body design was altered a new model was developed and tested. Furthermore, some prior processes required large amounts of computer time to calculate the airflow field for each body design from first principles. Accordingly, the prior processes are labor and time intensive.

The present invention provides processes for quickly and efficiently modeling engine cooling airflow.

II. SUMMARY OF THE INVENTION

Some embodiments relate to a process for evaluating airflow performance. The steps of such embodiments can comprise developing a three-dimensional computer-aided design model of a vehicle topology. Discretizing the vehicle topology. Discretizing a volume surrounding the vehicle topology, the volume being bounded by a chamber. Identifying vehicle topology components upon which to collect empirical data. Obtaining empirical data for identified components. Establishing an airflow field model. Validating the airflow field model in comparison to experimental data. Obtaining a mass flow rate from the validated airflow field model. Determining whether the mass flow rate is acceptable. Altering the vehicle topology. Altering the validated airflow field model to include changes to the vehicle topology. And, repeating the step of obtaining a mass flow rate and each subsequent step until an acceptable mass flow rate is determined.

Other embodiments relate to a process for predicting airflow rates. The steps of such embodiments can comprise developing a three-dimensional computer-aided design model of a test body topology. Discretizing the test body topology. Discretizing a volume surrounding the test body topology, the volume being bounded by a test chamber. Identifying test body components upon which to collect empirical data. Obtaining empirical data for identified components. Establishing an airflow model. Validating the airflow model in comparison to experimental data. Obtaining a flow rate from the validated airflow model. And, determining whether the mass flow rate is acceptable.

Other benefits and advantages will become apparent to those skilled in the art to which it pertains upon reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
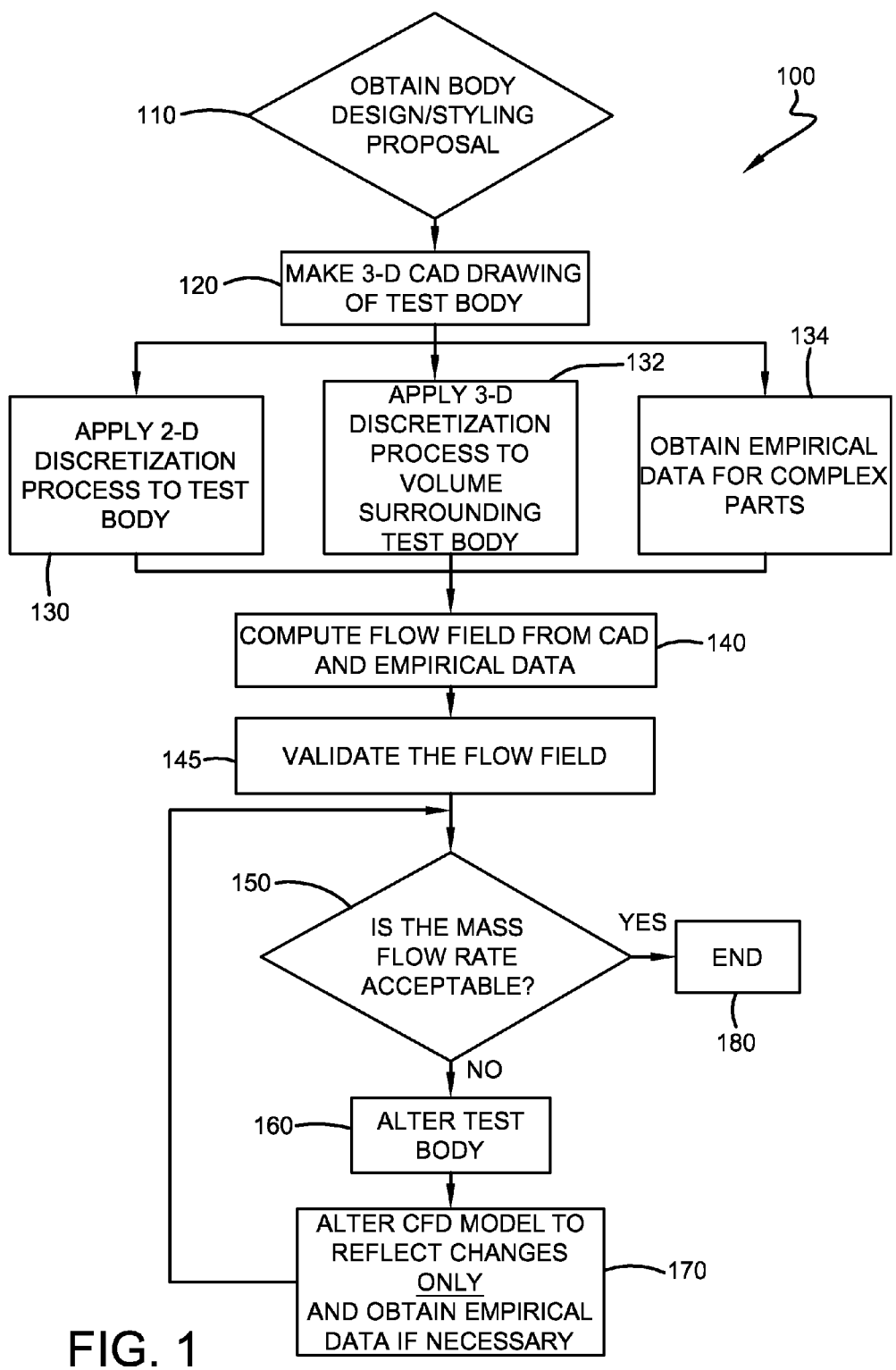
FIG. 1 is a flowchart illustrating a generalized embodiment of the present invention.

As used herein the term design, as it relates to automobile body designs, includes the outer body topology, topology of components located under the hood, any component affecting the flow pattern or flow rate of air over the radiator, and any styling elements. As used herein the term "virtual Senkosha" includes altering an existing automobile design to emulate a new automobile design. As used herein the term "aerodynamically relevant" includes surface features that are capable of affecting the airflow field to such a degree that neglecting such features would result in an unacceptable level of error. As used herein the term "safe operating range" as used in connection with engine temperature includes engine temperatures that result in acceptable rates of wear.

The present invention generally relates to a process for efficiently evaluating the effect of automobile body design and styling on the flow of engine-cooling airflow performance. Some embodiments include developing an initial computational fluid dynamic (CFD) model from a test body comprising an initial design and styling. The test body can then be altered to reflect design and/or styling modifications. The altered test body can then be quickly reassessed by taking into account only the changes to the design and/or styling relative to the initial CFD model.

In one embodiment a process within the scope of the present invention comprises developing a three-dimensional computer-aided design (3D CAD) model representing an automobile design and styling to be tested, i.e. a test body. A two-dimensional discretization method is then applied to the 3D CAD model, which breaks the model surface into units for subsequent computations. A three-dimensional discretization method is also applied to the volume of space surrounding the 3D CAD model and contained within a test volume, which similarly breaks the volume into units for subsequent computations. In this embodiment, the test volume represents the air volume surrounding the test body and contained within a forced-air test chamber. Alternatively, the test volume can represent the air surrounding the vehicle on an open road or test track.

Some components of a test body may have complex geometries, which are not amenable to computational methods. Accordingly, this embodiment includes obtaining empirical aerodynamic data for such components, and modifying the computational model with the empirical data. Then a flow field is computed using a CFD model, the two- and three-dimensional discretization data, and the empirical data obtained in preceding steps. The flow field represents the initial computational fluid dynamic model, i.e. the CFD model of the initial test body.

Further according to this embodiment, the initial test body can be modified to reflect new body designs and/or styling. A new flow field can be quickly computed by modifying the initial CFD model with data obtained from applying computational and/or empirical methods to the modified portions of the test body. One of skill in the art will appreciate that the foregoing steps comprising this embodiment may be carried out in various sequences, and some steps may be carried out simultaneously. Accordingly, the present invention is not restricted to the order of the steps explicitly set forth here or in other embodiments or examples set forth herein.

According to some embodiments a suitable discretization process comprises dividing a surface or volume into units upon which calculations can be performed. In some embodiments, appropriate two-dimensional discretization units can have a generally triangular shape. Furthermore, in some embodiments appropriate three-dimensional discretization units can have a generally tetrahedral shape, a generally hexahedral shape, or a generally polyhedral shape. However, in both the two-dimensional and the three-dimensional cases the shape of the discretization units is not limited to the shapes set forth here. One of skill in the art will recognize that alternative shapes can be appropriate, and will recognize when it is appropriate to use alternative shapes.

In some embodiments, the volume units yielded by the three-dimensional discretization process can be linked to one another. More particularly, some units may be linked to other volume units. In this case the volume units are generally in close proximity, and may be adjacent to each other. Additionally, some volume units may be linked to one or more structures in a manner that mimics the drag that results from pressure effects, viscous effects, other physical or surface effects, or any combination thereof. For example, some volume units may be linked to a test chamber wall. Other units may be linked to a surface unit of the test body. Still other volume units may be linked only to other volume units, but may be affected by proximity to other volume units that are linked to a structure.

Some embodiments can include components that have topologies that are too complex for direct computational methods, or that are outside of an acceptable level of resolution for the discretization method. For example, appropriate discretization methods should divide a component's surface into units that are at least smaller than the smallest aerodynamically relevant surface feature of the component. Accordingly, as relevant feature sizes decrease, the appropriate degree of resolution increases. Furthermore, as resolution increases, the computer time required to calculate the airflow field increases. Therefore, according to some embodiments time efficiency is enhanced by electing a lower resolution. In order to compensate for the lower resolution, empirical aerodynamic data is collected for components that would have required a finer resolution to accurately calculate their aerodynamic properties. In some embodiments, the discretization resolution should be about 10 times finer than the smallest aerodynamically relevant feature size. In other embodiments, the discretization resolution should be from greater than about 1 to about 2 times finer, from about 2 to about 4 times finer, from about 4 to about 6 times finer, from about 6 to about 8 times finer, or from about 8 to about 10 times finer than the smallest aerodynamically relevant feature.

Empirical aerodynamic data can be obtained according to any of a variety of methods known to those skilled in the art. According to one embodiment, the component can be placed in a forced-air test chamber, such as a wind tunnel. The component can then be subjected to airspeeds that mimic driving conditions, and aerodynamic data, such as air velocity and pressure change, can be collected. This and similar processes, may be referred to as a "spec test".

According to some embodiments, the two- and three-dimensional discretization data can be combined with the empirical data collected from the spec test, and an airflow field model can be obtained therefrom. In one embodiment, the air flow field can be obtained by applying computational fluid dynamic principles to the discretization data and the empirical data. In some embodiments, the airflow field can include air velocity, air mass flow, volume flow, and/or pressure field information. In other embodiments air velocity, air mass flow, and/or volume flow information can be derived from the field.

In some embodiments, the airflow field obtained in the preceding paragraph can be validated. Any of a variety of validation methods known to those of skill in the art may be used to determine the accuracy and/or precision of the airflow field. For example, in some embodiments, the field may be analyzed according to a regression process. In other embodiments, the field, or components thereof, may be compared to one or more known standards. In still other embodiments, the field, or components thereof, may be compared to empirical data.

According to one embodiment, a suitable method includes subjecting a radiator to air speeds that mimic operating conditions, and collecting air velocity data at an array of points over the surface of the radiator. Methods and devices for collecting air velocity data in this manner are well known to those of skill in the art, and thus require no description. Additionally, a similar set of air velocities are calculated using the model. According to this embodiment, the calculated set of velocities is compared to the measured set of velocities. Based on the results of the comparison, the model is either accepted or modified to more closely approximate the measured results.

A variety of methods can be appropriate for comparing velocities calculated from the model to measured velocities. In one embodiment, the calculated velocities are averaged, and the measured velocities are separately averaged. Then the difference is taken between the average calculated velocity and the average measured velocity. An acceptable difference can be between about zero and +/−10 percent. Other acceptable ranges can be between from about zero to about +/−2 percent, from about +/−2 to about +/−4 percent, from about +/−4 to about +/−6 percent, from about +/−6 to about +/−8 percent, and from about +/−8 to about +/−10 percent. Here, as elsewhere in the specification and claims, ranges may be combined.

According to some embodiments, the validated airflow field can be used to calculate an air mass flow rate. In some embodiments the value of the air mass flow rate determines, either alone or in combination with other factors, whether a body design is acceptable. Acceptable air mass flow rates range from about zero to about 10 m/s. Other acceptable mass flow rates range from about zero to about 1 m/s, from about 1 to about 2 m/s, from about 2 to about 3 m/s, from about 3 to about 4 m/s, from about 4 to about 5 m/s, from about 5 to about 6 m/s, from about 6 to about 7 m/s, from about 7 to about 8 m/s, from about 8 to about 9 m/s, and from about 9 to about 10 m/s. One of skill in the art will recognize that, while the mass flow rate (MFR) is given here in terms of velocity (v), the velocity term can be readily converted to mass flow rate by multiplying by known constants, i.e. area (A) and the density of air (d). Area is a device parameter, and should be determined for each test device. The density of air under typical atmospheric conditions can be approximated to be about $1.225 \text{ kg/m}^3$. Accordingly, mass flow rates are typically referred to herein in terms of velocity.

$$MFR = v * A * d$$

In general, acceptable air mass flow rates result in engine temperatures that are within the safe operating range of the engine. One of skill in the art will recognize that this temperature differs from engine to engine. Furthermore, one of skill in the art will recognize that acceptable flow rates depend on a number of factors including engine design and the aerodynamic properties of the vehicle and vehicle components.

Accordingly, a minimum acceptable flow rate can vary widely from one system to another, and can be separately established for each new system without undue experimentation.

If the model predicts an air mass flow rate that is unacceptable, then the body design may be altered. The model can then be adjusted to reflect the new or altered body design, and the air mass flow rate can be recalculated to determine whether the design modification results in an acceptable flow rate. This process may progress through as many iterations as necessary to produce an acceptable result. Furthermore, in some embodiments, the process may be reiterated even after producing an acceptable result. Accordingly, such embodiments can yield a plurality of acceptable body designs.

Referring now to the drawings wherein the showings are for purposes of illustrating embodiments of the invention only and not for purposes of limiting the same, FIG. 1 is a flowchart showing the steps of an embodiment 100. According to this embodiment, an initial automobile body design is obtained or determined 110. A 3D CAD drawing is prepared representing the initial body design 120. A two-dimensional discretization process is applied to the 3D CAD drawing 130. In a parallel step, a three-dimensional discretization process is applied to the volume of space surrounding the 3D CAD drawing and contained within a test chamber 132. In a second parallel step, empirical test data is obtained to determine the aerodynamic characteristics of parts that are too complex for CFD models applied to the CAD drawing 134.

Figure 2:
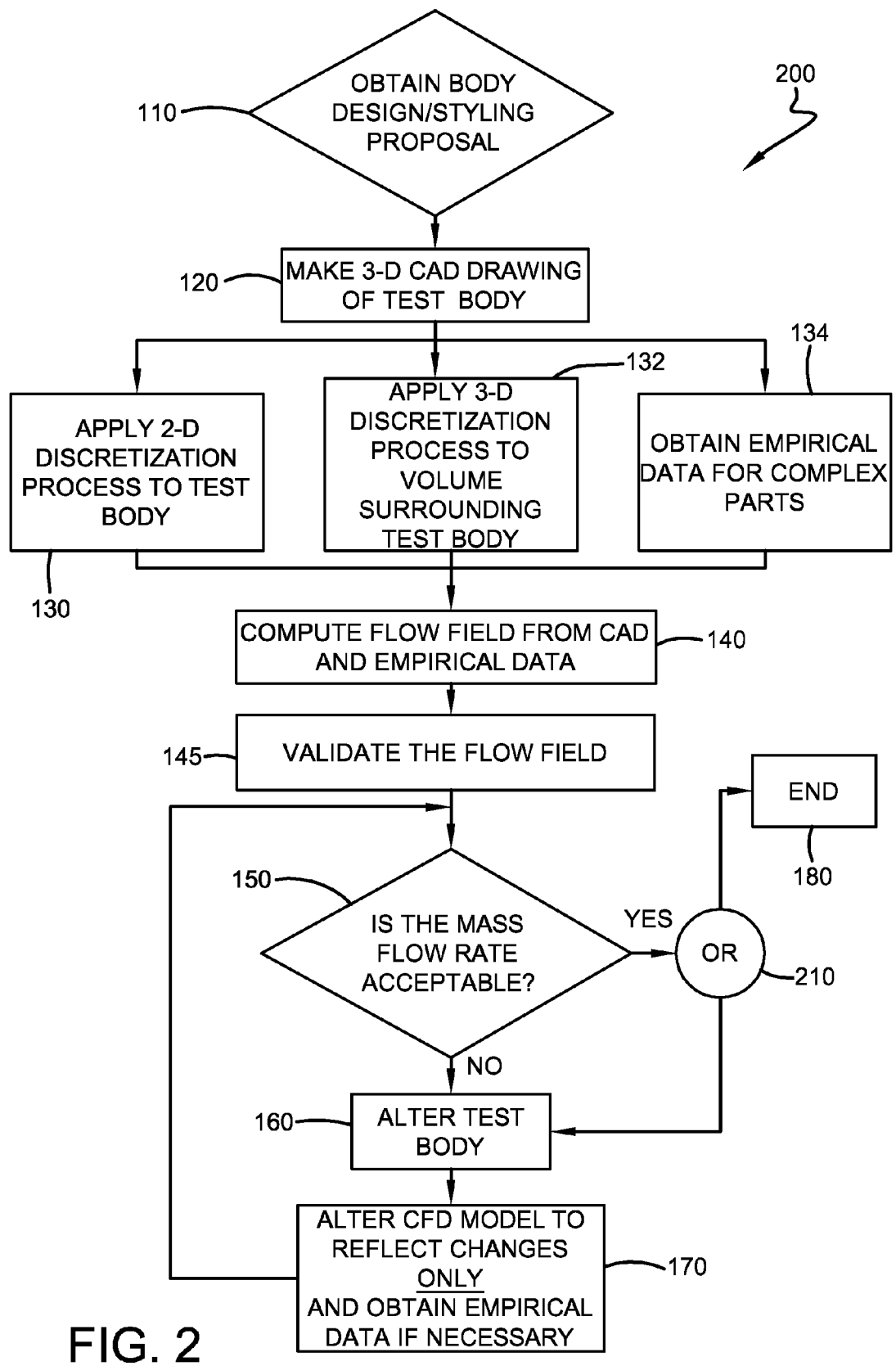
FIG. 2 is a flowchart illustrating a variation of FIG. 1.

The data generated in steps 130, 132, and 134 is then processed according to computational fluid dynamic methods, and a flow field is obtained thereby 140. The flow field obtained in step 140 is then validated in step 145, and the validated flow field is regarded as the initial flow field. The initial flow field is then assessed for sufficiency. Particularly, the mass flow rate of air over the radiator is assessed and a determination is made as to whether or not the flow rate is sufficient to satisfy engine cooling requirements 150. According to this embodiment, if the body design does not produce acceptable mass flow results then the design is altered 160. The alteration comprises a new body design. Alternatively, if the design yields acceptable flow results then the design can be accepted, and the process can be exited 180. Assuming that the process has not continued to the exit step 180, a new flow field is obtained 170. The new flow field, representing the altered design, is more quickly calculated by replacing only the altered portions of the initial body design and retaining the computational results of un-altered portions of the body design. After calculating the flow field of the new body design the process loops back to the decision step 150. The loop can be exited when a body design yields acceptable mass flow results. In a related embodiment 200, illustrated in FIG. 2, when the mass flow rate is found in step 150 to be acceptable the process can either be exited or, step 210, the process can continue to step 160 to create and assess an additional new design.

The embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

We claim:

1. A process for evaluating airflow performance, comprising the steps of:

developing a three-dimensional computer-aided design model of a vehicle topology;
discretizing the design model vehicle topology;
discretizing a volume surrounding the design model vehicle topology, the volume having outer boundaries;
identifying vehicle topology components upon which to collect empirical data;
obtaining empirical data for identified components;
establishing an airflow field model;
validating the airflow field model in comparison to experimental data;
obtaining a mass flow rate from the validated airflow field model;
determining whether the mass flow rate is acceptable;
altering the vehicle topology;
altering the validated airflow field model to include changes to the vehicle topology;
repeating the step of obtaining a mass flow rate and each subsequent step until an acceptable mass flow rate is determined; and,
wherein the step of identifying comprises selecting a maximum discretization resolution, and determining whether the maximum discretization resolution is too low to accurately resolve the smallest aerodynamically relevant surface features of a component.

2. A process for evaluating airflow performance, comprising the steps of:

developing a three-dimensional computer-aided design model of a vehicle topology;
discretizing the design model vehicle topology;
discretizing a volume surrounding the design model vehicle topology, the volume having outer boundaries;
identifying vehicle topology components upon which to collect empirical data;
obtaining empirical data for identified components;
establishing an airflow field model;
validating the airflow field model in comparison to experimental data;
obtaining a mass flow rate from the validated airflow field model;
determining whether the mass flow rate is acceptable;
altering the vehicle topology;
altering the validated airflow field model to include changes to the vehicle topology;
repeating the step of obtaining a mass flow rate and each subsequent step until an acceptable mass flow rate is determined;
wherein the step of validating comprises comparing predictions obtained from the airflow field model to experimental data, and determining that an acceptable level of error exists between the model and the experimental data; and,
wherein the acceptable level of error is from about zero percent to about 10 percent error.

3. A process for evaluating airflow performance, comprising the steps of:

developing a three-dimensional computer-aided design model of a vehicle topology;
discretizing the design model vehicle topology;
discretizing a volume surrounding the design model vehicle topology, the volume having outer boundaries;
identifying vehicle topology components upon which to collect empirical data;
obtaining empirical data for identified components;
establishing an airflow field model;
validating the airflow field model in comparison to experimental data;
obtaining a mass flow rate from the validated airflow field model;

determining whether the mass flow rate is acceptable;
altering the vehicle topology;
altering the validated airflow field model to include changes to the vehicle topology;
repeating the step of obtaining a mass flow rate and each subsequent step until an acceptable mass flow rate is determined; and,
wherein the step of determining whether the mass flow rate is acceptable further comprises determining whether the mass flow rate is less than or equal to 10 meters per second.

4. A process for evaluating airflow performance, comprising the steps of:
developing a three-dimensional computer-aided design model of a vehicle topology;
discretizing the design model vehicle topology;
discretizing a volume surrounding the design model vehicle topology, the volume having outer boundaries;
identifying vehicle topology components upon which to collect empirical data;
obtaining empirical data for identified components;
establishing an airflow field model;
validating the airflow field model in comparison to experimental data;
obtaining a mass flow rate from the validated airflow field model;
determining whether the mass flow rate is acceptable;
altering the vehicle topology;
altering the validated airflow field model to include changes to the vehicle topology;
repeating the step of obtaining a mass flow rate and each subsequent step until an acceptable mass flow rate is determined; and,
wherein the step of altering the validated airflow field model to include changes to the vehicle topology further comprises replacing only altered portions of the vehicle topology; and, retaining computational results of un-altered portions of the vehicle topology.

5. The process of claim 4, wherein the vehicle topology comprises the topology of an outer body, a radiator, and any component that may affect the mass flow rate of air at a radiator air inlet.

6. The process of claim 4, wherein the volume surrounding the vehicle topology simulates a volume comprising a forced air test chamber, an open air test track, or an open road.

7. The process of claim 4, wherein the step of obtaining empirical data comprises measuring air velocity at one or more points up stream from a radiator component, measuring a pressure difference between at least one point up stream from the radiator component and at least one point down stream from the radiator component.

8. The process of claim 4, wherein the step of establishing an airflow field model comprises combining two-dimensional discretization data, three dimensional discretization data, and the empirical data.

9. The process of claim 8, further comprising applying fluid dynamic principles to the combined data and obtaining an airflow field therefrom.

10. The process of claim 4, wherein the step of validating comprises comparing predictions obtained from the airflow field model to experimental data, and determining that an acceptable level of error exists between the model and the experimental data.

11. The process of claim 10, wherein the step of comparing further comprises taking the difference between an average measured air velocity and an average calculated air velocity.

12. The process of claim 4, wherein the step of obtaining a mass flow rate further comprises obtaining a mass flow rate near a radiator air inlet.

13. The process of claim 4, wherein the step of determining whether the mass flow rate is acceptable further comprises observing that the mass flow rate results in an engine's temperature that is within the engine's safe operating range.

14. A process for evaluating airflow performance, comprising the steps of:
developing a three-dimensional computer-aided design model of a vehicle topology;
discretizing the design model vehicle topology;
discretizing a volume surrounding the design model vehicle topology, the volume having outer boundaries;
identifying vehicle topology components upon which to collect empirical data;
obtaining empirical data for identified components;
establishing an airflow field model;
validating the airflow field model in comparison to experimental data;
obtaining a mass flow rate from the validated airflow field model;
determining whether the mass flow rate is acceptable;
altering the vehicle topology;
altering the validated airflow field model to include changes to the vehicle topology;
repeating the step of obtaining a mass flow rate and each subsequent step until an acceptable mass flow rate is determined;
wherein the step of altering the validated airflow field model further comprises subtracting portions of the model that do not reflect the altered vehicle topology and replacing the subtracted portions with portions that reflect the altered vehicle topology; and,
wherein the step of altering the validated airflow field model further comprises retaining at least a portion of the calculations from the step of establishing an airflow field model.

15. A process for predicting airflow rates, comprising the steps of:
developing a three-dimensional computer-aided design model of a test body topology;
discretizing the design model test body topology;
discretizing a volume surrounding the design model test body topology, the volume being bounded by a test chamber;
identifying test body components upon which to collect empirical data;
obtaining empirical data for identified components;
establishing an airflow model;
validating the airflow model in comparison to experimental data;
obtaining a mass flow rate from the validated airflow model;
determining whether the mass flow rate is acceptable; and,
wherein the step of identifying comprises selecting a maximum discretization resolution, and detei mining whether the maximum discretization resolution is too low to accurately resolve the smallest aerodynamically relevant surface features of the test body.

16. The process of claim 15, wherein the step of obtaining empirical data comprises measuring air velocity at one or more points up stream from a component of the test body, measuring the pressure difference between at least one point up stream from the component and at least one point down stream from the component.

17. The process of claim 15, wherein the step of validating comprises comparing predictions obtained from the airflow model to experimental data, and determining that an acceptable level of error exists between the model and the experimental data.

18. A process for predicting airflow rates, comprising the steps of:
- developing a three-dimensional computer-aided design model of a test body topology;
- discretizing the design test body topology;
- discretizing a volume surrounding the design model test body topology, the volume being bounded by a test chamber;
- identifying test body components upon which to collect empirical data;
- obtaining empirical data for identified components;
- establishing an airflow model;
- validating the airflow model in comparison to experimental data;
- obtaining a mass flow rate from the validated airflow model;
- determining whether the mass flow rate is acceptable;
- wherein the step of validating comprises comparing predictions obtained from the airflow model to experimental data, and determining that an acceptable level of error exists between the model and the experimental data; and,
- wherein the acceptable level of error is from about zero percent to about 10 percent error.

* * * * *